Feb. 16, 1965 A. E. CALLOW ETAL 3,169,380
COOLING OF SOLIDS
Filed Nov. 14, 1962
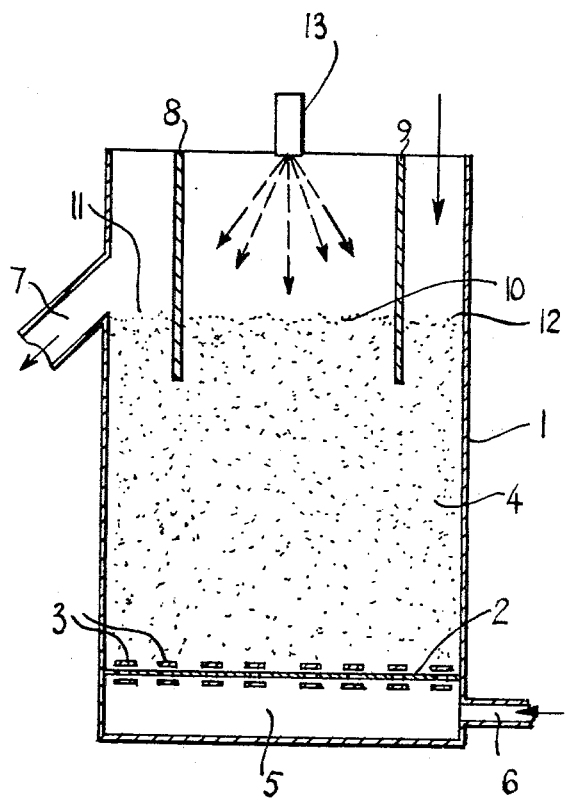
INVENTORS
ALAN EDWARD CALLOW and
BERNARD HARRIS
BY Oscar L. Spencer
ATTORNEY

United States Patent Office 3,169,380
Patented Feb. 16, 1965

3,169,380
COOLING OF SOLIDS
Alan Edward Callow, Normanby, Middlesbrough, and Bernard Harris, Acklam, Middlesbrough, England, assignors to British Titan Products Company Limited, Durham, England, a corporation of the United Kingdom
Filed Nov. 14, 1962, Ser. No. 237,674
Claims priority, application Great Britain, Nov. 14, 1961, 40,740/61
6 Claims. (Cl. 62—57)

The present invention relates to the cooling of hot particulate solids. It particularly relates to such solids which are capable of being fluidised.

It is frequently necessary to cool hot particulate solids. An example of this occurs in the vapour phase oxidation of a titanium tetrahalide in a fluidised bed, as described in British Patent 761,770. During this oxidation, part of the titanium dioxide produced forms an accretion on the bed particles which consequently grow in volume. In order to maintain the bed volume at its original level, it is therefore necessary to remove, either continuously or intermittently, a portion of the bed material. On being removed, such material is initially at a temperature of about 900° C.–1200° C. In order to recover the titanium dioxide which has been retained on the bed particles it is necessary to subject these particles to grinding and before this can be done the particles must be cooled, for example to a temperature below about 200° C. Where large quantities of such particles are to be so treated it is desirable that they be cooled as quickly as possible, before being subjected to grinding and recirculated to the fluidised bed after the accreted titanium dioxide has been removed, in order to provide a continuous process.

Another case in which it may be useful to cool hot particulate solids is the low temperature fluidised bed coking process. In this process, a hydrocarbon vapour is carbonised in the presence of seed particles of coke which form a fluidised bed, so that the particles grow in size before removal from the bed for further treatment. It is desirable to cool these particles before such further treatment.

There are many other instances where it is desirable to cool hot particulate solids in a quick and convenient manner.

The present invention provides a process for the cooling of hot particulate solids, comprising feeding particulate solids to be cooled into a fluidising chamber, maintaining in the chamber a fluidised bed of the solids the bed surface being divided into a plurality of sections by means of a baffle or baffles, spraying a vapourisable cooling liquid on the surface of the bed, and withdrawing cooled particulate solids from a section or sections of the bed not subjected to the spray of cooling liquid. Preferably, the particulate solids to be cooled are fed into a section or sections of the bed not subjected to the spray of cooling liquid.

The bed is preferably fluidised by means of a gas whose temperature is below that of the particulate solids to be cooled.

The present invention also provides apparatus for cooling hot particulate solids by the above process, comprising a fluidised bed chamber; means for spraying a vapourisable cooling liquid on the surface of a fluidised bed formed therein; a baffle or baffles adapted to limit the area of the surface of the bed sprayed by the cooling liquid; and an outlet for bed material located outside such area.

The baffle or baffles may suitably be placed so that its or their lower edge or edges extends or extend below the surface of the fluidised bed. Thus, the edge or edges may project about 2 inches below the surface of the bed.

The fluidised bed chamber is suitably a cylindrical vessel of material capable of withstanding the action of the hot fluidised solid. The lower part of such a vessel will normally contain a gas-permeable plate upon which the bed of solid rests when not fluidised, and through which the fluidising gases can pass. An example of such a plate is a perforated plate in which the perforations are provided with caps or the like to prevent solid from passing downwards through the perforations. Examples of means for introducing the fluidising gas are described in our United States Patents Nos. 2,957,757, and 3,057,701, and Birtish Patent No. 921,531.

The fluidising gas will generally be some gas which is readily available in large quantities and which does not have a deleterious effect upon the hot solids. In many cases air is suitable.

This gas is conveniently introduced into a wind box beneath the gas-permeable plate and is distributed by this plate through the bed. The gas must, of course, be passed through the bed at a rate at least sufficient to fluidise the bed. It may be advantageous to use rates of flow in excess of this minimum, though of course still below the rate where substantial entrainment of the bed particles takes place.

The fluidising gas may itself have on the particulate solids a cooling effect which may supplement that of the vapourisable cooling liquid. For this purpose the fluidising gas should preferably not be heated before entering the bed. The cooling effect of the fluidising gas will be particularly great if it is passed through the bed at a high rate of flow since the higher the rate of gas flow the quicker the removal of heat from the solid, although, as mentioned above, the rate should of course not be high enough for substantial entrainment of the bed particles to take place. A generally suitable rate is one which is from 3 to 20 times that which is just sufficient to fluidise the bed.

In many cases the vapourisable cooling liquid is most suitably water, although other liquids can be used if desired, provided they have no adverse effect upon the solid to be cooled. Of course, the amount of cooling liquid sprayed on the bed must not be so great as to prevent the fluidising of the bed.

The liquid is conveniently introduced through a fine spray device situated above the centre of the bed surface.

The apparatus of the present invention may comprise simply a single baffle separating the area of the surface of the bed sprayed by the cooling liquid from an overflow outlet port for the cooled particulate solid; by this means blocking of the outlet port may be prevented. As an improvement, the apparatus may also comprise a baffle separating the area of the surface of the bed sprayed by the cooling liquid from an inlet admitting to the upper part of the bed particulate solid to be cooled; by this means the vapour of the cooling liquid may be hindered from passing into the inlet and causing aggregation of the particulate solid in the inlet. A single baffle may fulfill the function of both the above-mentioned baffles if it has a suitable shape and is suitably placed; thus it may be a circular baffle.

The baffles preferably comprise two vertical and parallel metal plates placed on opposite sides of the cooling spray the lower edges of both plates projecting below the fluidised bed surface. A distance of about 2" below the surface has been found convenient, although this may be varied as desired.

In the preferred embodiment of the invention the baffles divide the bed surface into three sections, a centre section which receives the cooling spray and two outer sections upon which the spray does not directly impinge.

The hot solid to be cooled is fed to one outer section and the cooled solid is withdrawn from the other outer section. This withdrawal of solid may be effected, for example, by means of a stand pipe or suitably placed exit port.

When the cooling of hot particulate solids, such as that from the vapour phase oxidation process described above, is attempted in the absence of baffles it is often found that the solids tend to coagulate in the bed to form aggregates which tend to impede the withdrawal of cooled solids from the bed.

This difficulty is eliminated by using the baffle or baffles of the present invention, and uninterrupted withdrawal of solids can be obtained over prolonged periods of operation.

In the drawing there is shown in cross-section one preferred embodiment of the present invention. The following example describes in detail this preferred embodiment of the present invention.

*Example*

The fluidised bed chamber is a cylindrical vessel 1 of mild steel 12" in diameter. A perforated gas-permeable plate 2 is fitted across the base of the vessel 1. The perforations are covered with caps 3 to prevent passage of solid from the bed 4 which is to be formed in the chamber 1. Beneath the plate 3 is a wind box 5 supplied with air under pressure through a conduit 6. A downwardly directed exit port 7 is provided 8" above the perforated plate. Two parallel baffle plates of mild steel 8 and 9, each 10 inches high, are fixed across the vessel 1 so as to be about 8 inches apart, thus dividing the bed surface into a centre section 10 and two outer sections 11 and 12. The lower edge of each baffle plate extends 2" below the lower lip of the exit port 7. A spray device 13 is fitted above the bed between the baffle plates 8 and 9 and at approximately the same height as the upper edges of the baffle plates.

Provision is made for supplying hot particulate solid to the outer section 12 of the bed surface, this section being at the opposite side of the chamber 1 to the exit port 7.

Titanium dioxide particles of diameters within the range 150 microns to 350 microns and at a temperature of about 700° C. were continuously fed to the outer surface section 12 at a rate of 167 lbs. per hour, and air was passed through the gas-permeable plate 3 at a rate of 7.5 cu. ft. per minute. By means of the spray device 13 water was sprayed on the centre surface section 10 of the bed at a rate of 15 litres per hour.

Cooled particles were continuously withdrawn from the chamber 1 through the exit port 7 at the same rate as that at which the hot particles were fed into the chamber, i.e. 167 lbs. per hour. The temperature of the cooled particles after withdrawal through the exit port 7 was in the range of about 150° C.–180° C. At this temperature they could be readily handled; for example, they could be ground and supplied, if desired, to a fluidised bed in which the vapour phase oxidation of a titanium tetrahalide was being carried out.

What is claimed is:

1. A process of cooling hot particulate solids which comprises passing a gas through a bed of the hot solids at a rate of flow sufficient to fluidize the bed, feeding a cooling fluid to a portion of an upper surface of the fluid bed, introducing hot particulate solids to a portion of the bed removed from that portion in contact with the cooling fluid, and removing cooled particulate solids from another portion of the bed not subjected to the cooling fluid.

2. A continuous process of cooling hot particulate titanium dioxide which comprises passing a gas upwardly through a bed of the hot titanium dioxide, said bed having an upper surface and a lower surface, adding hot particulate titanium dioxide to a first portion of the upper surface while concurrently feeding a vaporizable cooling liquid to a second portion of the upper surface, and concurrently removing cooled titanium dioxide from a third portion of the upper surface, the first and third portions of the bed surface being out of contact with the second portion whereby there is no direct contact of the cooling liquid with the titanium dioxide being added and removed from the bed.

3. The process of claim 2 wherein the temperature of the hot titanium dioxide initially added to the bed is 500° C. to 1200° C.

4. A process for cooling hot particulate titanium dioxide which comprises passing a gas through a bed of the hot titanium dioxide at a rate of flow sufficient to fluidize the bed, the temperature of the gas being less than that of the hot particulate titanium dioxide in the bed, feeding a cooling fluid to a portion of the upper surface of the bed while simultaneously introducing hot titanium dioxide to a portion of the bed not in contact with the cooling fluid and withdrawing cooled titanium dioxide from another portion of the bed not in contact with the cooling fluid.

5. A process for cooling hot titanium dioxide particles which comprises passing a cooling gas to a bed of the hot titanium dioxide particles at a rate of flow 3 to 20 times that which is sufficient to fluidize the bed, feeding a vaporizable cooling liquid to a portion of the upper surface of the bed at a rate sufficient to cool the titanium dioxide, but not so great a rate as to prevent the fluidization of the bed by the gas, simultaneously introducing hot titanium dioxide to a portion of the bed not in contact with the cooling liquid and withdrawing cooled titanium dioxide from another portion of the bed not in contact with the cooling liquid.

6. The process of claim 1 wherein the gas is introduced at a rate of flow 3 to 20 times that which is just sufficient to fluidize the bed and the cooling fluid is introduced at a rate sufficient to cool the hot particulate solids, but not so great a rate as to prevent fluidizing of the bed by the gas.

References Cited in the file of this patent

UNITED STATES PATENTS

| | | |
|---|---|---|
| 1,844,782 | Mittag | Feb. 9, 1932 |
| 2,309,036 | Beardsley | Jan. 19, 1943 |
| 2,607,199 | Christensen | Aug. 19, 1952 |
| 2,783,884 | Schaub | Mar. 5, 1957 |
| 3,036,440 | Feinman | May 29, 1962 |